United States Patent
Fujimoto et al.

(10) Patent No.: US 9,681,364 B2
(45) Date of Patent: Jun. 13, 2017

(54) WIRELESS COMMUNICATION SYSTEM, MANAGEMENT DEVICE, WIRELESS DEVICE, AND WIRELESS COMMUNICATION METHOD

(71) Applicant: YOKOGAWA ELECTRIC CORPORATION, Musashino-shi, Tokyo (JP)

(72) Inventors: Naoyuki Fujimoto, Tokyo (JP); Masato Yamaji, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 101 days.

(21) Appl. No.: 14/437,248

(22) PCT Filed: Oct. 7, 2013

(86) PCT No.: PCT/JP2013/077228
§ 371 (c)(1),
(2) Date: Apr. 21, 2015

(87) PCT Pub. No.: WO2014/065104
PCT Pub. Date: May 1, 2014

(65) Prior Publication Data
US 2015/0282054 A1    Oct. 1, 2015

(30) Foreign Application Priority Data
Oct. 23, 2012    (JP) .................................. 2012-233767

(51) Int. Cl.
*H04W 4/00* (2009.01)
*H04W 48/16* (2009.01)
*H04W 48/18* (2009.01)
*H04W 52/02* (2009.01)
*H04W 72/04* (2009.01)

(52) U.S. Cl.
CPC .......... *H04W 48/16* (2013.01); *H04W 48/18* (2013.01); *H04W 52/0206* (2013.01); *H04W 72/0446* (2013.01); *Y02B 60/50* (2013.01)

(58) Field of Classification Search
CPC .............................. H04L 12/66; H04W 36/14
USPC .................................. 370/252–253, 328–349
See application file for complete search history.

(56) References Cited

U.S. PATENT DOCUMENTS

| 7,986,657 | B2 | 7/2011 | Dobrowski et al. |
| 8,655,326 | B2 * | 2/2014 | Ait-Ameur ........... H04L 67/322 455/414.1 |
| 2010/0121977 | A1 * | 5/2010 | Kontola ................ H04L 1/0002 709/232 |

FOREIGN PATENT DOCUMENTS

JP    2005-073118 A    3/2005

* cited by examiner

*Primary Examiner* — Iqbal Zaidi
(74) *Attorney, Agent, or Firm* — Sughrue Mion, PLLC

(57) ABSTRACT

A wireless communication system includes a wireless device configured to make a request to join a wireless network in a case that a first estimated joining time is reached, the first estimated joining time being a time to join the wireless network. In addition, the wireless communication system includes a management device configured to cause the wireless device that made a joining request to join the wireless network, and cause the wireless device to leave the wireless network, the leave of the wireless device being caused in a case that a wireless communication by the wireless device via the wireless network is completed.

18 Claims, 9 Drawing Sheets

| EUI64 | TAG | DEVICE TYPE | LEAVE FLAG | UPDATING INTERVAL |
|---|---|---|---|---|
| 00:00:00:00:00:00:00:01 | Tag001 | EJX | 1 | 1 HOUR |
| 00:00:00:00:00:00:00:02 | Tag002 | EJX | 1 | 1 HOUR |
| 00:00:00:00:00:00:00:03 | Tag003 | EJX | 1 | 1 HOUR |
| 00:00:00:00:00:00:00:04 | Tag004 | EJX | 1 | 1 HOUR |
| 00:00:00:00:00:00:00:05 | Tag005 | YTA | 0 | 1 HOUR |
| ⋮ | ⋮ | ⋮ | ⋮ | ⋮ |

Q3

WIRELESS COMMUNICATION SYSTEM, MANAGEMENT DEVICE, WIRELESS DEVICE, AND WIRELESS COMMUNICATION METHOD

CROSS REFERENCE TO RELATED APPLICATIONS

This is a National Stage of International Application No. PCT/JP2013/077228 filed Oct. 7, 2013, claiming priority based on Japanese Patent Application No. 2012-233767 filed Oct. 23, 2012, the contents of all of which are incorporated herein by reference in their entirety.

TECHNICAL FIELD

The present invention relates to a wireless communication system, a management device, a wireless device, and a wireless communication method.

The present application claims priority based on Japanese patent application 2012-233767, filed on Oct. 23, 2012 and includes herein by reference the content thereof.

BACKGROUND ART

Conventionally, in order to achieve a high level of automated operation in a plant, a factory, or the like, a distributed control system (DCS) is implemented. In a distributed control system, on-site devices (measuring instruments and actuators), which are referred to as field devices are connected via a communication means to a control apparatus that controls the field devices. Although the communication system forming the base of such a distributed control system had almost always communicated by cable, recent years have seen the implementation of communication systems that communicate wirelessly, in conformance with an industrial wireless communication standard such as ISA100.11a or WirelessHART (registered trademark).

A wireless communication system conforming to these wireless communication standards uses TDMA (time-division multiple access) as the media access method. In this wireless communication system, a management device called a system manager (or a network manager), which manages communication resources (channels, time slots, and the like) in the TDMA system, is provided. Specifically, the management device creates a communication schedule, in which time slots and channels mutually differing between each wireless communication performed via a wireless communication network are allocated, and manages the communication resources so that allocations of communication resources do not overlap.

In this case, field devices (wireless field devices) used in the above-noted wireless communication system are basically installed singly in a plant or the like and cannot receive electrical power supplied from outside (for example, electrical power supplied via a communication bus). For this reason, batteries are used as power sources for field devices and, in order to reduce the power consumption of the field devices as much as possible, power-saving operation is done in accordance with a communication schedule created by the above-noted management device. Specifically, when a field device does not need to communicate, it goes into the sleep state. The sleep state is a state in which a field device is joined to a wireless network but does not transmit or receive a wireless signal, so as to reduce the power consumption as much as possible. Only if the need arises for a field device to communicate, does it transition to the active state, and use communication resources allocated by the management device to transmit or receive a wireless signal. The active state is the state in which a field device can transmit or receive a wireless signal.

In the above-noted wireless communication system, a prerequisite for communication to be performed normally in accordance with the communication schedule created by the management device is that the times of wireless devices (including wireless field devices) performing wireless communication via a wireless network are mutually synchronized. For this reason, in a wireless communication system, downstream wireless devices (for example, wireless field devices) periodically (for example, at an interval of several minutes) acquire time information from upstream wireless devices (such as wireless routers). At a downstream wireless device, an operation (clock updating) is done to correct the device's own time, using the acquired time information. Patent Reference 1 noted below discloses an example of a conventional wireless field device performing the above-described power-saving operation.

PRIOR ART REFERENCE

Patent Reference

[Patent Reference 1] U.S. Pat. No. 7,986,657

SUMMARY OF THE INVENTION

Problem to be Solved by the Invention

In a conventional wireless communication system, a wireless device communicating wirelessly via a wireless network, regardless of whether or not it performs the above-described power-saving operation, is in a state in which it has joined a wireless network (joined state). In this case, specifically, the joined state is a state in which all of the following states (a) to (c) are satisfied.

(a) The state in which time is synchronized with the wireless communication system, (b) The state in which encrypted communication setting has been completed and the security of communication with another wireless device has been established, and (c) The state in which a certain wireless bandwidth (time slot and channel) has been allocated.

Because a wireless device in the joined state can transmit or receive a wireless signal in accordance with a communication schedule created by the management device, it has the advantage of being able to implement real-time performance (with almost no transmission delay (latency)). However, because a wireless device in the joined state occupies a certain wireless bandwidth (time slot and channel), the number of wireless devices that can join a wireless network is limited.

For example, in a wireless communication system in which there are 100 time slots of one second and 16 channels, if each wireless device is assumed to perform wireless communication one time only in a period of one second, the maximum number of wireless devices that can join the wireless network is limited to 1600.

In actuality, if a certain amount of margin in the time slots and channels used is considered, the number of wireless devices that can join the wireless network is limited to approximately 1000.

Also, in a conventional wireless communication system, as described above, it is necessary for each wireless device to periodically perform clock updating to maintain mutual synchronization. Because the clock updating must be performed periodically even if data transmitting and receiving are not done, this is a factor in preventing a reduction of the power consumed by the wireless devices. If the power consumption of a wireless device is large, incorporating a high-cost battery having a commensurately large capacity is required, making it difficult to reduce the cost of the wireless device when the battery cost is included.

An aspect of the present invention is a wireless communication system, a management device, a wireless device, and a wireless communication method enabling more wireless devices to join a wireless network than conventionally possible and further enabling a reduction in the power consumed by the wireless devices.

Means to Solve the Problem (1) A first aspect of the present invention is a wireless communication system including: a wireless device configured to make a request to join a wireless network in a case that a first estimated joining time is reached, the first estimated joining time being a time to join the wireless network; and a management device configured to cause the wireless device that made a joining request to join the wireless network, and cause the wireless device to leave the wireless network, the leave of the wireless device being caused in a case that a wireless communication by the wireless device via the wireless network is completed.

(2) In the first aspect of the present invention, before the wireless device is caused to leave the wireless network, the management device may be configured to set a second estimated joining time, the second estimated joining time being a time to cause the wireless device to join the wireless network after the first estimated joining time.

(3) In the first aspect of the present invention, the management device may be configured to transmit, to the wireless device, information of the second estimated joining time, and the wireless device may be configured to receive the information of the second estimated joining time, and make a request to join the wireless network, the request to join the wireless network being made in a case that the second estimated joining time is reached.

(4) In the first aspect of the present invention, the management device may be configured to set the second estimated joining time and a third estimated joining time so that there is temporal dispersion between the second estimated joining time and the third estimated joining time, the third estimated joining time being for causing a different wireless device to join the wireless network.

(5) In the first aspect of the present invention, the management device may include a storage unit that stores a table in which identification information and a flag are associated with each other, the identification information identifying the wireless device, the flag indicating whether or not the wireless device is to be caused to leave the wireless network, and the management device may be configured to control whether or not the wireless device is to be caused to leave the wireless network, the control being performed based on a flag corresponding to identification information obtained from the wireless device.

(6) In the first aspect of the present invention, the management device may be configured to cause the wireless device to leave the wireless network in a case that the flag indicates that the wireless device is to be caused to leave the wireless network, and in a case that the wireless communication is completed, and the management device may be configured not to cause the wireless device to leave the wireless network in a case that the flag indicates that the wireless device is not to be caused to leave the wireless network, and even in a case that the wireless communication is completed.

(7) In the first aspect of the present invention, the wireless communication system may include an upstream management device configured to set the contents of the table stored in the storage unit of the management device.

(8) In the first aspect of the present invention, the management device may be configured to cause the wireless device to leave the wireless network by setting the wireless device to: a first state in which time synchronization between the wireless device and the wireless communication system is not maintained; a second state in which security of communication between the wireless device and another wireless device is not established; and a third state in which wireless resources are not allocated to the wireless device.

(9) In the first aspect of the present invention, the wireless device may further include: a measurement unit configured to measure a state quantity; and a communication unit configured to transmit, to the management device, the state quantity measured by the measurement unit, the transmission of the state quantity being performed from the time of joining the wireless network until the time of leaving the wireless network.

(10) In the first aspect of the present invention, the wireless device may include a clock unit configured to keep time, wherein the clock unit may be configured so as not to perform time synchronization with the wireless communication system while the wireless device has left the wireless network.

(11) A second aspect of the present invention is a management device including: a communication unit configured to receive, from a wireless device, a request to join a wireless network; and a control unit configured to cause the wireless device that made a joining request to the wireless network to join the wireless network, and cause the wireless device to leave the wireless network, the leave of the wireless device being caused in a case that a wireless communication by the wireless device via the wireless network is completed.

(12) In the second aspect of the present invention, the management device may further include a setting unit configured to set the next time of joining the wireless network with respect to the wireless device, the setting of the next time being performed before the wireless device is caused to leave the wireless network.

(13) In the second aspect of the present invention, the management device may further include a storage unit that stores a table in which identification information and a flag are associated with each other, the identification information identifying the wireless device, the flag indicating whether or not the wireless device is to be caused to leave the wireless network, wherein the control unit may be configured to control whether or not the wireless device is to be caused to leave the wireless network, the control being performed based on a flag corresponding to identification information obtained from the wireless device.

(14) A third aspect of the present invention is a wireless device including: a storage unit that stores an estimated joining time, the estimated joining time being a time to join the wireless network; and a control unit configured to make a request to join the wireless network in a case that the estimated joining time stored in the storage unit is reached.

(15) In the third aspect of the present invention, the storage unit may store, in addition to the estimated joining time, a first information and a second information, the first information regarding communication resources that were required the previous time of making a request to join the wireless network, the second information indicating the deviation in time between the time of the wireless network and the time of the wireless device, and the control unit may be configured to use the estimated joining time, and the first and second information stored in the storage unit to perform processing to join the wireless network.

(16) In the third aspect of the present invention, the control unit may be configured to calculate the searching time period, the calculation of the searching time period being performed by using the estimated joining time, and the first and second information, and the control unit may be configured to search for a repeater device that relays a connection of the wireless device to the wireless network, the search being performed during the searching time period.

(17) In the third aspect of the present invention, the control unit may be configured to make a request to join the wireless network in a case that a pre-established event occurs, the request to join the wireless network being performed regardless of the estimated joining time.

(18) In the third aspect of the present invention, the wireless device may further include a detection unit configured to detect, as the pre-established event, an abnormality of the wireless device, and wherein the control unit may be configured to make a request to join the wireless network in a case that the detection unit detects the pre-established event.

(19) A fourth aspect of the present invention is a wireless communication method including: making a request to join a wireless network in a case that an estimated joining time is reached, the estimated joining time being a time to join the wireless network; causing a wireless device that made the joining request to join the wireless network and causing wireless communication by the wireless device via the wireless network; and causing the wireless device to leave the wireless network in a case that the wireless communication via the wireless network has been completed.

Effect of the Invention

According to the aspect of the present invention, a wireless device that has sent a joining request to a wireless network is caused to join the wireless network, and when wireless communication via the wireless network by the wireless device joined to the wireless network is completed, the wireless device is removed from the wireless network. For this reason, it is possible to have more wireless devices join a wireless network than conventionally possible. Also, by removing a wireless device from a wireless network, because the time correction (clock updating) which has been conventionally required is not required, it is possible to reduce the power consumption of the wireless device, thereby enabling a reduction of the cost of the wireless device when the battery cost is included.

EMBODIMENT FOR CARRYING OUT THE INVENTION

A wireless communication system, a management device, a wireless device, and a wireless communication method according to the first and the second embodiments of the present invention will be described below, with references made to the drawings.

First Embodiment

The first embodiment of the present invention will first be described.

(Wireless Communication System Overall Constitution)

Figure 1:
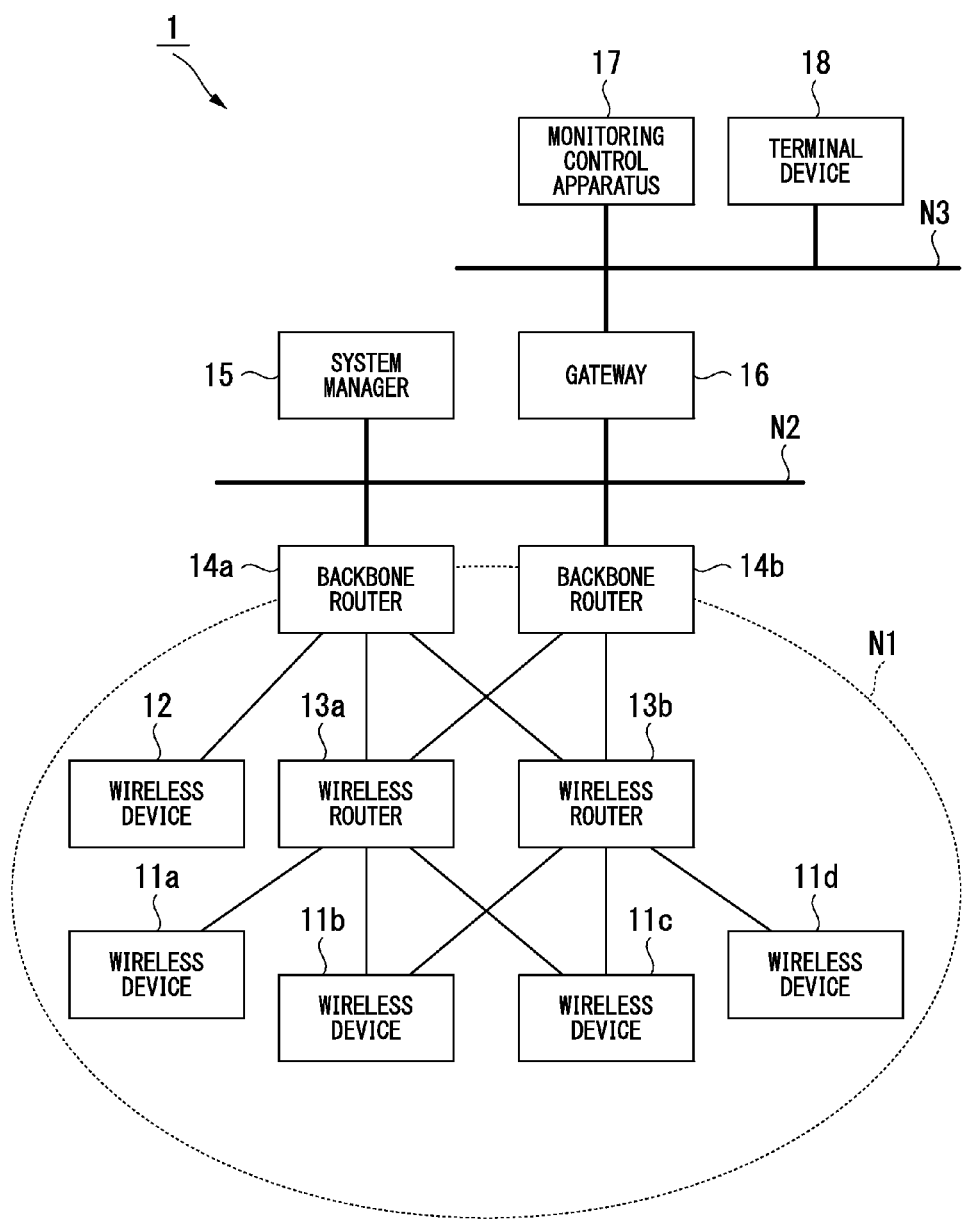
FIG. 1 is a drawing showing the overall constitution of a wireless communication system according to a first embodiment of the present invention.

FIG. 1 shows the overall constitution of a wireless communication system 1 according to the first embodiment of the present invention. As shown in FIG. 1, the wireless communication system 1 of the first embodiment has wireless devices 11a to 11d, a wireless device 12, wireless routers 13a and 13b, backbone routers 14a and 14b, a system manager 15 (management device), a gateway 16, a monitoring control apparatus 17 (upstream management device), and a terminal device 18 (upstream management device). The wireless communication system 1 communicates wirelessly by TDMA (time-division multiple access) via a wireless network N1. The wireless communication system 1 is implemented, for example, in a plant or factory (this being referred to collectively hereinafter as simply a "plant").

The plant in which the wireless communication system 1 is implemented is provided with the wireless network N1, a backbone network N2, and a control network N3. The wireless network N1 is implemented by devices (wireless devices 11a to 11d, the wireless device 12, wireless routers 13a and 13b, and backbone routers 14a and 14b) installed on-site in the plant. The wireless network N1 is managed by the system manager 15. The number of wireless devices, wireless routers, and backbone routers forming the wireless network N1 is arbitrary.

The backbone network N2 is a cable network forming the backbone of the wireless communication system 1. The backbone network N2 has connected thereto backbone routers 14a and 14b, the system manager 15, and the gateway 16. The control network N3 is a cable network positioned upstream from the backbone network N2. The control network N3 has connected thereto the gateway 16, the monitoring control apparatus 17, and the terminal device 18.

The wireless devices 11a to 11d and the wireless device 12 are, for example, sensor devices such as flow gauges and temperature sensors, valve devices such as flow control valves and open/close valves, actuator devices such as fans and motors, and other field devices installed in a plant. The wireless devices 11a to 11d and the wireless device 12 operate under the control of the monitoring control apparatus 17. The wireless devices 11a and 11d and the wireless device 12 perform power-saving operation (for example, intermittent operation), using a battery as a power source. The wireless devices 11a to 11d and the wireless device 12 communicate wirelessly by TDMA conforming to ISA100.11a. However, the above-noted wireless devices 11a to 11d and the wireless device 12 differ regarding whether or not they maintain the state in which they have joined the wireless network N1 (joined state).

Specifically, when planned wireless communication (wireless communication via the wireless network N1) is completed after joining the wireless network N1, a wireless device 11a to 11d leaves the wireless network N1 under the control of the system manager 15. In contrast, the wireless device 12, similar to a conventional wireless device, maintains its joined state after it joins the wireless network N1 under the control of the system manager 15.

In this manner, when it is not necessary to communicate wirelessly, the wireless devices 11a to 11d leave the wireless network N1 to release the communication resources, thereby enabling more wireless devices to join the wireless network N1 than conventionally possible. This is also done to reduce the power consumption of the wireless devices 11a to 11d by eliminating the clock updating (periodic time synchronization) required when maintaining the joined state.

The state in which a wireless devices 11a to 11d has left the wireless network N1 (left state) is a state in which, specifically, all the following states (A) to (C) are satisfied.

(A) The state in which time synchronization with the wireless communication system is maintained, (B) The state in which the security of communication with another wireless device is not established, and (C) The state in which wireless bandwidth (time slot and channel) has not be allocated.

The above-noted wireless devices 11a to 11d and the wireless device 12 differ with respect to the timing of joining the wireless network N1. Specifically, the wireless devices 11a to 11d have as a prerequisite that they will leave the wireless network N1 after joining the wireless network N1. For this reason, the wireless devices 11a to 11d make a joining request when the estimated joining time (time of joining the wireless network N1) set by the system manager 15 is reached. In contrast, the wireless device 12 maintains the joined state after joining the wireless network N1. For this reason, the wireless device 12 basically makes a request to join the wireless network N1 (joining request) to the system manager 15 at the time of an instruction from a worker. The details of the wireless devices 11a to 11d will be described later.

The wireless routers 13a and 13b communicate wirelessly with the wireless devices 11a to 11d, the wireless device 12, and the backbone routers 14a and 14b in conformance with ISA100.11a. The wireless routers 13a and 13b relay data transmitted and received between the wireless devices 11a to 11d, the wireless device 12, and the backbone routers 14a and 14b. The wireless routers 13a and 13b, similar to the wireless devices 11a and 11d and the wireless device 12, perform power-saving operation by, for example, intermittent operation, using a battery as a power source. In FIG. 1, the state in which the wireless device 12 is directly connected to the backbone router 14a is illustrated. However, the wireless device 12, similar to the wireless devices 11a to 11d, may be connected to the backbone routers 14a and 14b via the wireless routers 13a and 13b.

The wireless routers 13a and 13b periodically transmit advertising packets to the wireless devices 11a to 11d and the wireless device 12. These advertising packets are used to connect the wireless devices 11a to 11d and the wireless device 12 to the wireless network N1 or to have the wireless devices 11a to 11d and the wireless device 12 joined to the wireless network N1 perform time synchronization. Also, although to simplify the description in this case, the description will be for the case in which both the wireless routers 13a and 13b transmit advertising packets, advertising packets may be transmitted by only one of the wireless routers 13a and 13b.

The backbone routers 14a and 14b connect the wireless network N1 to the backbone network N2. The backbone routers 14a and 14b relay data transmitted and received between the wireless network N1 and the backbone network N2. The backbone routers 14a and 14b operate continuously by, for example, direct-current electric power supplied from the backbone network N2 or direct-current electric power supplied via a path other than the backbone network N2. Doing this, the backbone routers 14a and 14b communicate wirelessly in conformance with the above-noted wireless communication standard ISA100.11a.

The system manager 15 operates continuously by electric power supplied from, for example, a commercial power source, and controls wireless communication via the wireless network N1. Specifically, the system manager 15 controls the allocation of communication resources (time slots and channels) to the wireless devices 11a to 11d, the wireless device 12, the wireless routers 13a and 13b, the backbone routers 14a and 14b, and the gateway 16. Doing this, the system manager 15 implements wireless communication by TDMA via the wireless network N1.

The system manager 15 performs processing (joining processing) to join the wireless devices 11a to 11d, the wireless device 12, and the like to the wireless network N1. The system manager 15 also performs processing (leaving processing) to have the wireless devices 11a to 11d leave the wireless network N1.

The system manager 15 performs the above-noted leaving processing based on device information, in which identifiers of wireless devices are associated with flags that indicate whether or not the wireless devices are to be caused to leave the wireless network N1. When wireless devices 11a to 11d are to be removed from the wireless network N1, the system manager 15 sets the time of the next joining to the wireless network N1 as the estimated joining time with respect to the wireless devices 11a to 11d. Details of the system manager 15 will be described later.

The gateway 16 connects the backbone network N2 to the control network N3. The gateway 16 relays various data transmitted and received between the wireless devices 11a to 11d, the wireless device 12, the system manager 15, and the like and the monitoring control apparatus 17 and the terminal device 18. Providing the gateway 16 enables mutual connection between the backbone network N2 and the control network N3, while maintaining security.

The monitoring control apparatus 17 monitors and manages the wireless devices 11a to 11d, the wireless device 12, and the like. Specifically, the monitoring control apparatus 17 collects measurement data from the wireless devices 11a to 11d and the wireless device 12, via the gateway 16. By doing this, the monitoring control apparatus 17 monitors the wireless devices 11a to 11d, the wireless device 12, and the like.

The monitoring control apparatus 17 determines controlled quantities of the wireless devices 11a to 11d and the wireless device 12, based on the collected measurement data, and sets these into the wireless devices 11a to 11d and the wireless device 12 via the gateway 16. By doing this, the monitoring control apparatus 17 controls the wireless devices 11a to 11d and the wireless device 12.

The monitoring control apparatus 17 sets and changes the above-noted device information stored in the system manager 15.

The terminal device 18 is operated, for example, by an operator of the plant, and is used to monitor and control the wireless devices 11a to 11d and the wireless device 12. Specifically, the terminal device 18 has an input device such as a keyboard or a pointing device, and a display device such as a liquid-crystal display device. The terminal device 18 displays on a display device for the operator the results obtained by the monitoring control apparatus 17 monitoring the wireless devices 11a to 11d and the wireless device 12 on a display device. The terminal device 18 outputs instructions input by the operator operating an input device to the monitoring control apparatus 17 and has the monitoring control apparatus 17 perform control based on those instructions. The terminal device 18, similar to the monitoring control apparatus 17, can set and change the above-noted device information stored in the system manager 15.

(Constitution of Wireless Devices 11a to 11d)

Figure 2:
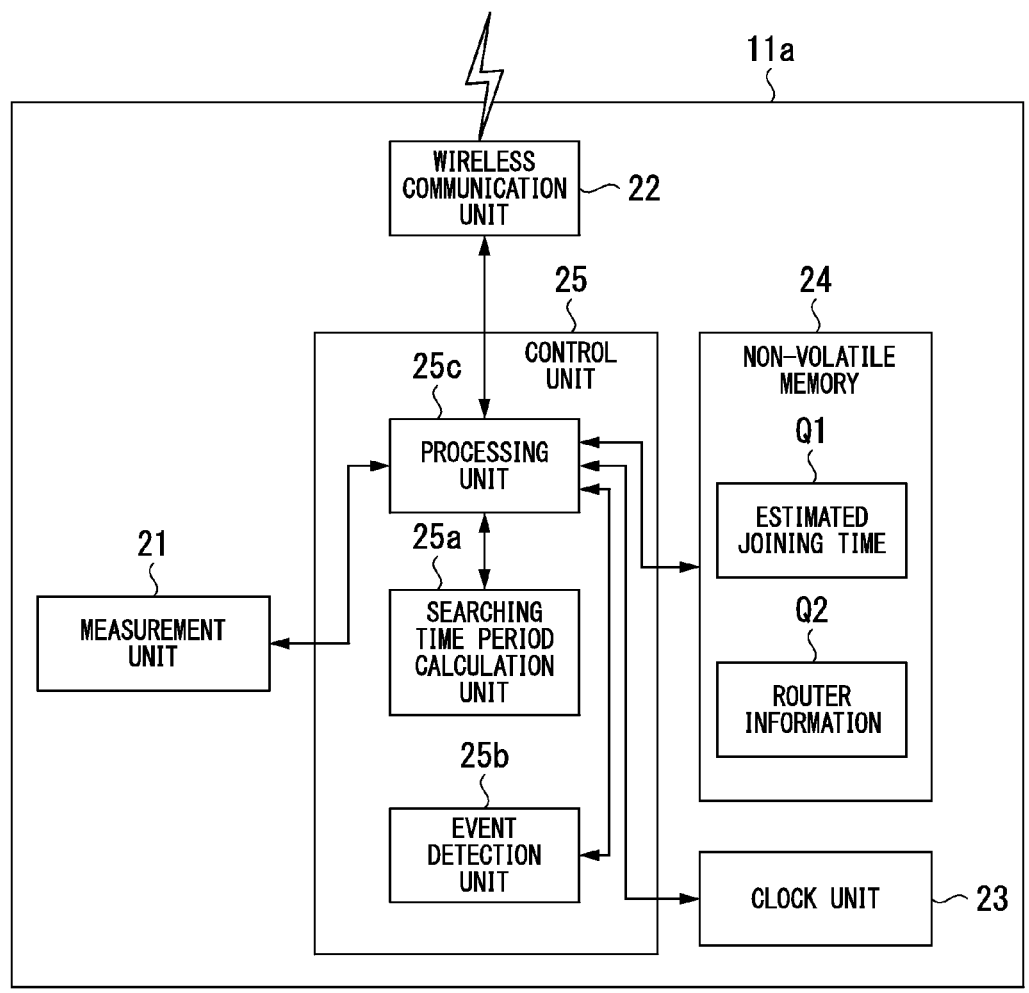
FIG. 2 is a block diagram showing the main constitution of a wireless device according to the first embodiment of the present invention.

FIG. 2 is a block diagram showing the main constitution of the wireless device 11a according to the first embodiment of the present invention.

Because the wireless devices 11a to 11d each have the same constitution, the description herein will be of the wireless device 11a. The wireless device 11a is, for example, a sensor device that measures various state quantities in an industrial process (for example, pressure, temperature, and flow amount). As shown in FIG. 2, the wireless device 11a has a measurement unit 21, a wireless communication unit 22, a clock unit 23, a non-volatile memory 24 (storage unit), and a control unit 25.

The measurement unit 21 has a measuring instrument such as a pressure gauge, a thermometer, or a flow gauge, measures a state quantity in an industrial process (for example, pressure, temperature, or flow amount), and outputs a process value indicating the measurement results. The wireless communication unit 22, under control of a processing unit 25c of the control unit 25, wirelessly communicates via the wireless network N1. Wireless communication by the wireless communication unit 22 conforms to the wireless communication standard ISA100.11a.

The clock unit 23 keeps the time and outputs current time data indicating the current time to the processing unit 25c of the control unit 25.

Specifically, the clock unit 23 has a quartz oscillating element that oscillates with an accuracy of approximately plus/minus several tens of ppm (parts per million), and keeps time by detecting the frequency of oscillation of the quartz oscillating element. The time kept by the clock unit 23 is corrected by the processing unit 25c of the control unit 25 when the wireless device 11a joins the wireless network N1, this being done to perform synchronization with the wireless router 13a and system manager 15.

The non-volatile memory 24 stores the estimated joining time Q1 required for the wireless device 11a to join the wireless network N1 and the router information Q2. The estimated joining time Q1 is the approximate time for the wireless device 11a that has left the wireless network N1 to join the wireless network N1. The estimated joining time Q1 is set by the system manager 15 when the wireless device 11a leaves the wireless network N1.

The router information Q2 indicates the parent router (wireless routers 13a and 13b or backbone routers 14a and 14b, this being the wireless router 13a in the example shown in FIG. 1) to which the wireless device 11a had been connected before it left the wireless network N1. Specifically, the router information Q2 includes advertising packet hopping pattern information (first information), advertising packet receiving link information (first information), and time deviation information (second information). The advertising packet hopping pattern information indicates the sequence of channel switching used for periodic (for example, every 4 seconds) transmission of advertising packets by the parent router. The advertising packet receiving link information is link information (offsets and frequencies) for receiving advertising packets transmitted by the parent router. The time deviation information indicates the time deviation between the parent router and the wireless device 11a.

The advertising packet hopping pattern information and advertising packet receiving link information of the router information Q2 are set by the system manager 15 after the wireless device 11a joins the wireless network N1. In contrast, the time deviation information of the router information Q2 is calculated by the processing unit 25c of the control unit 25 of the wireless device 11a by the wireless device 11a receiving advertising packets periodically transmitted from the parent router. Specifically, if the interval of the parent router transmitting advertising packets is T1 seconds and the interval of the wireless device 11a receiving advertising packets from the parent router is T2 seconds, the processing unit 25c of the control unit 25 calculates the time deviation D in ppm using the following Equation (1).

$$D=(T2-R1)/T1\times 1000000 \qquad (1)$$

The processing unit 25c of the control unit 25 performs overall control of the operation of the wireless device 11a. For example, the processing unit 25c of the control unit 25 controls the measurement unit 21 to cause it to measure various state quantities in an industrial process, controls the wireless communication unit 22 so as to join the wireless device 11a to the wireless network N1, or controls the wireless communication unit 22 to transmit a process value measured by the measurement unit 21 to the monitoring control apparatus 17 via the wireless network N1.

The control unit 25 has a searching time period calculation unit 25a, an event detection unit 25b and the processing unit 25c. The searching time period calculation unit 25a calculates the time period for parent router searching when the wireless device 11a joins the wireless network N1. In this manner, the time period for searching for the parent router is calculated in order to reduce the power consumption as much as possible when the wireless device 11a joins the wireless network N1. For the wireless device 11a to join the wireless network N1, it is first necessary to search for the parent router. Because searching for the parent router requires searching on a plurality of channels, the power consumption of the wireless device 11a becomes large, and if the search for the parent router takes a long period of time, unneeded power consumption occurs in the wireless device 11a. Given this, in order to reduce the power consumption in the wireless device 11a as much as possible, the searching time period is determined by the searching time period calculation unit 25a, and the time for searching for the parent router is limited.

Specifically, if the time of receiving the advertising packet immediately before the wireless device 11a leaves the wireless network N1 is t0, the searching time period calculation unit 25a determines the searching start time t1 for starting the search for the parent router using the following Equation (2).

$$t1 = t0 + (T2 \times n) - (T2 \times n) \times D/1000000 \times S \quad (2)$$

In Equation (2) above, T2 is the interval (in seconds) at which the wireless device 11a had been receiving advertising packets from the parent router, D is the time deviation determined by the above-noted Equation (1), S is safety margin rate (an arbitrary value) set to perform the advertising packet receiving safely, and n is the quotient obtained by dividing the above-described estimate joining time Q1 by the interval T2 for receiving the advertising packets.

The searching time period calculation unit 25a determines the searching time period T for continuation of the searching using the following Equation (3).

$$T = (T2 \times n) \times D/1000000 \times S \times 2 \quad (3)$$

Therefore, when the wireless device 11a joins the wireless network N1, the wireless device 11a searches for the parent router from the searching start time t1 obtained by the above-noted Equation (2) until the completion of the searching time period T obtained by the above-noted Equation (3) (that is, until the searching end time t2, which is t1+T).

The event detection unit 25b detects an occurrence of a pre-established event from various events occurring within the wireless device 11a. For example, when an abnormality occurs within the wireless device 11a, the event detection unit 25b detects an event to that effect.

Such an event detection unit 25b is provided to forcibly join the wireless device 11a that has left the wireless network N1 to the wireless network N1. That is, when the wireless device 11a leaves the wireless network N1, it basically does not join the wireless network N1 until reaching the estimated joining time Q1 (or, precisely, the above-noted searching start time t1) set by the system manager 15. If an abnormality occurs in the state of having left the wireless network N1, because it is necessary to quickly join the wireless network N1 and notify the monitoring control apparatus 17 to that effect, the wireless device 11a is forcibly joined to the wireless network N1.

The processing unit 25c of the control unit 25 is connected to the measurement unit 21, the wireless communication unit 22, the clock unit 23, and the non-volatile memory 24 and controls processing by the wireless device 11a.

The processing unit 25c is connected to the searching time period calculation unit 25a and the event detection unit 25b and controls the processing by the control unit 25.

The processing unit 25c is constituted by a CPU (central processing unit) or the like.

(System Manager 15 Constitution)

Figure 3:
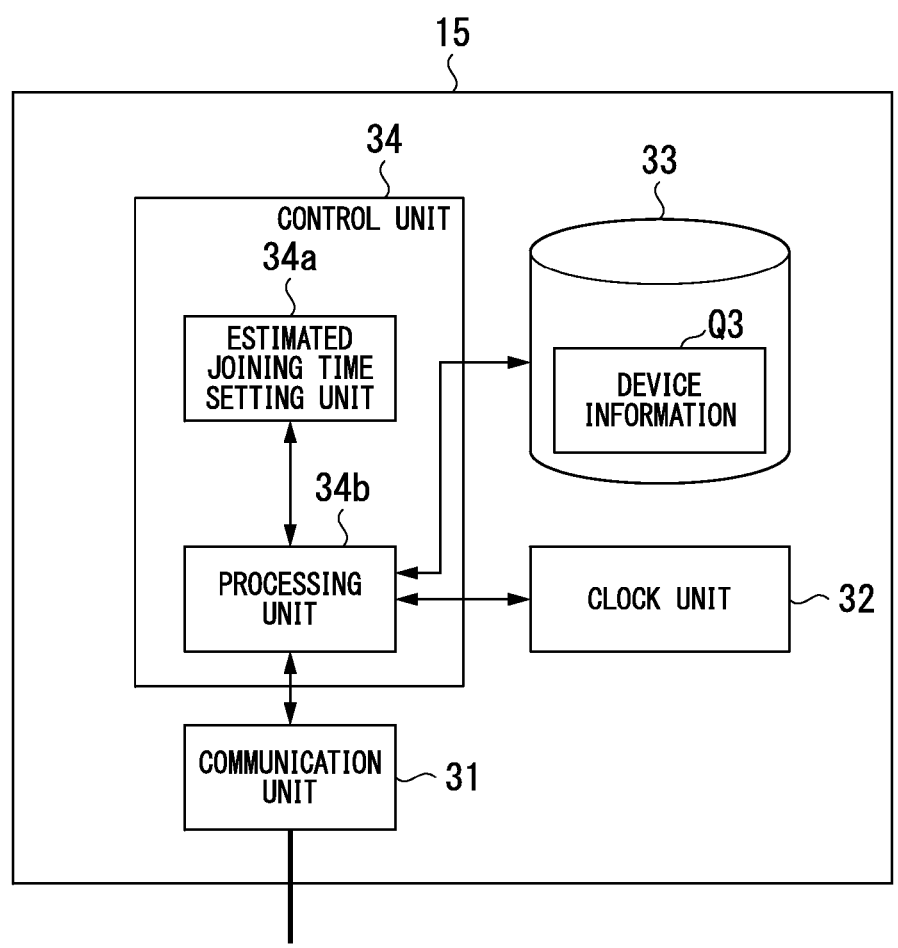
FIG. 3 is a block diagram showing the main constitution of a system manager as a management device according to the first embodiment of the present invention.

FIG. 3 is a block diagram showing the main constitution of the system manager 15 as a management device according to the first embodiment of the present invention. As shown in FIG. 3, the system manager 15 has a communication unit 31, a clock unit 32, a storage unit 33, and a control unit 34. The communication unit 31 communicates via the backbone network N2 under the control of a processing unit 34b of the control unit 34. The clock unit 32, similar to the clock unit 23 provided in the wireless device 11a, keeps time and outputs time data indicating the current time to the processing unit 34b of the control unit 34. However, the time kept by the clock unit 32 of the system manager 15 serves as the reference for wireless devices communicating wirelessly via the wireless network N1. For this reason, the clock unit 32 keeps time with a higher accuracy than that of the clock unit 23 provided in the wireless device 11a.

Figures 4, 5:
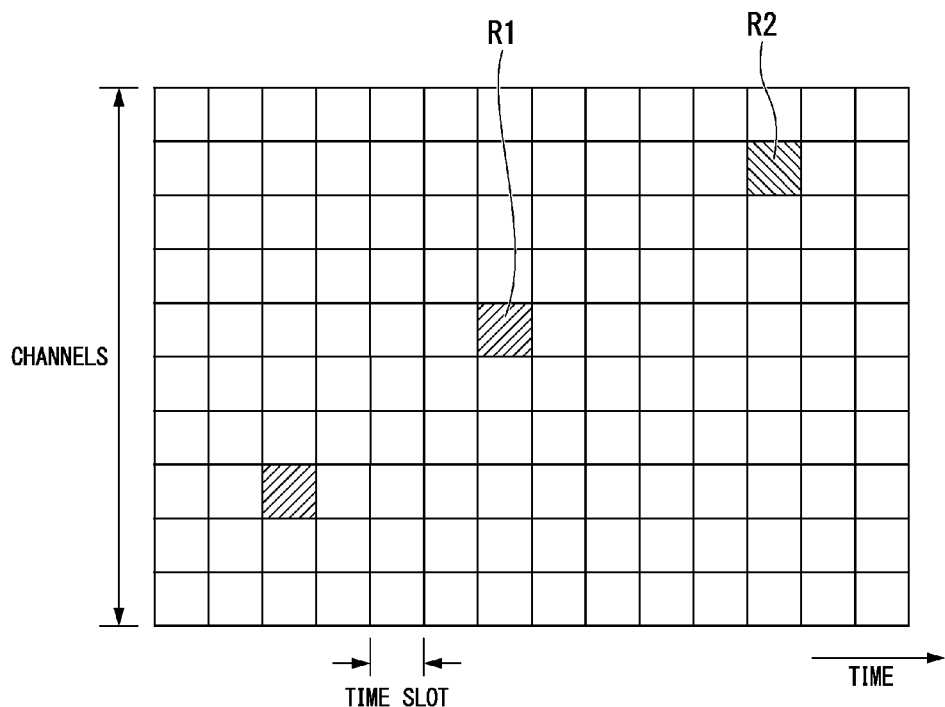
FIG. 4 is a drawing showing one example of device information used in a system manager.
FIG. 5 is a drawing for describing communication resources allocated in the first embodiment of the present invention.

The storage unit 33 is implemented by an external storage device, such as a hard disk, and stores the device information Q3 for controlling whether or not to cause the wireless devices 11a to 11d and the wireless device 12 to leave the wireless network N1. FIG. 4 shows one example of the device information Q3 used in the system manager 15. As shown in FIG. 4, the device information Q3 is a table of information in which "EUI64", "Tag", "Device type", "Leave flag", "Updating interval" and the like are associated.

The EUI64 is 64-bit identification information allocated to each of the wireless devices 11a to 11d and the wireless device 12 that uniquely identifies the wireless devices 11a to 11d and the wireless device 12. The "Tag" is information assigned to, for example, each of the wireless devices 11a to 11d and the wireless device 12 so that a worker performing operation on-site in the plant can easily identify the wireless devices 11a to 11d and the wireless device 12. The "Device type" is information indicating the type of the wireless devices 11a to 11d and the wireless device 12.

The "Leave flag" is information indicating whether or not the wireless devices 11a to 11d and the wireless device 12 are to be removed from the wireless network N1. When a leave flag value is 1, it indicates that the wireless device will be removed from the wireless network N1, and a value of 0 indicates that the wireless device will not be removed from the wireless network N1 and will maintain its joined state. The "Updating interval" is information indicating the interval for transmitting process values measured by the wireless devices 11a to 11d and the wireless device 12 to the monitoring control apparatus 17.

In the example shown in FIG. 4, the EUI64 having the lower two digits of 01 to 04 are allocated to the wireless devices 11a to 11d, respectively. The EUI64 having the lower two digits of 05 is allocated to the wireless device 12. The wireless devices 11a to 11d are removed from the wireless network N1 under the management of the system manager 15. For this reason, the values of the leave flags corresponding to the EUI64 having the lower two digits of 01 to 04 are set to 1. In contrast, because the wireless device 12 maintains the joined state under the control of the system manager 15 after it joins the wireless network N1, the value of the Leave flag corresponding to the EUI64 having the lower two digits of 05 is set to 0.

The processing unit 34b of the control unit 34 performs overall control of the operation of the system manager 15. For example, in order to implement wireless communication by TDMA via the wireless network N1, it controls allocation of communication resources (time slots and channels) with respect to the wireless devices communicating wirelessly via the wireless network N1 (the wireless devices 11a to 11d, the wireless device 12, wireless routers 13a and 13b, and backbone routers 14a and 14b) and the gateway 16.

The communication resources allocated by the processing unit 34b of the control unit 34 will now be described. FIG. 5 describes the communication resources allocated in the first embodiment of the present invention. In FIG. 5, the horizontal axis represents time and the vertical axis represents channels (wireless communication frequencies). In FIG. 5, each block in the horizontal direction indicates a time slot, and each block in the vertical direction indicates a channel. To simplify the illustration, only 10 channels are shown in FIG. 5.

In FIG. 5, blocks with hatching indicate communication resources allocated by the processing unit 34b of the control unit 34, and blocks without hatching indicate communication resources not allocated by the processing unit 34b of the control unit 34. For example, in FIG. 5, the block marked R1 indicates communication resources allocated for the backbone router 14a to transmit data to the wireless router 13a. The block marked R2 indicates communication resources allocated for the backbone router 14a to transmit data to the wireless device 12. In this manner, the processing unit 34b of the control unit 34 allocates communication resources so that there is no mutual overlap between wireless communication performed via the wireless network N1.

If there is a request to join the wireless network N1, the processing unit 34b of the control unit 34 performs processing to join the wireless device that made the joining request to the wireless network N1. It also references the device information Q3 stored in the storage unit 33 and performs processing to remove the wireless devices 11a to 11d from the wireless network N1.

The control unit 34 has an estimated joining time setting unit 34a and the processing unit 34b. The estimated joining time setting unit 34a sets as the estimated joining time Q1 the time of the next joining to the wireless network N1 with respect to a wireless device that will be removed from the wireless network N1. The estimated joining time setting unit 34a references the updating interval of the device information Q3 stored in the storage unit 33 and sets the estimated joining time Q1 so that the estimated joining times Q1 set in the wireless devices 11a to 11d are distributed. This is done so that wireless devices 11a to 11d do not join the wireless network N1 simultaneously.

(Wireless Communication System Operation)

Figure 6:
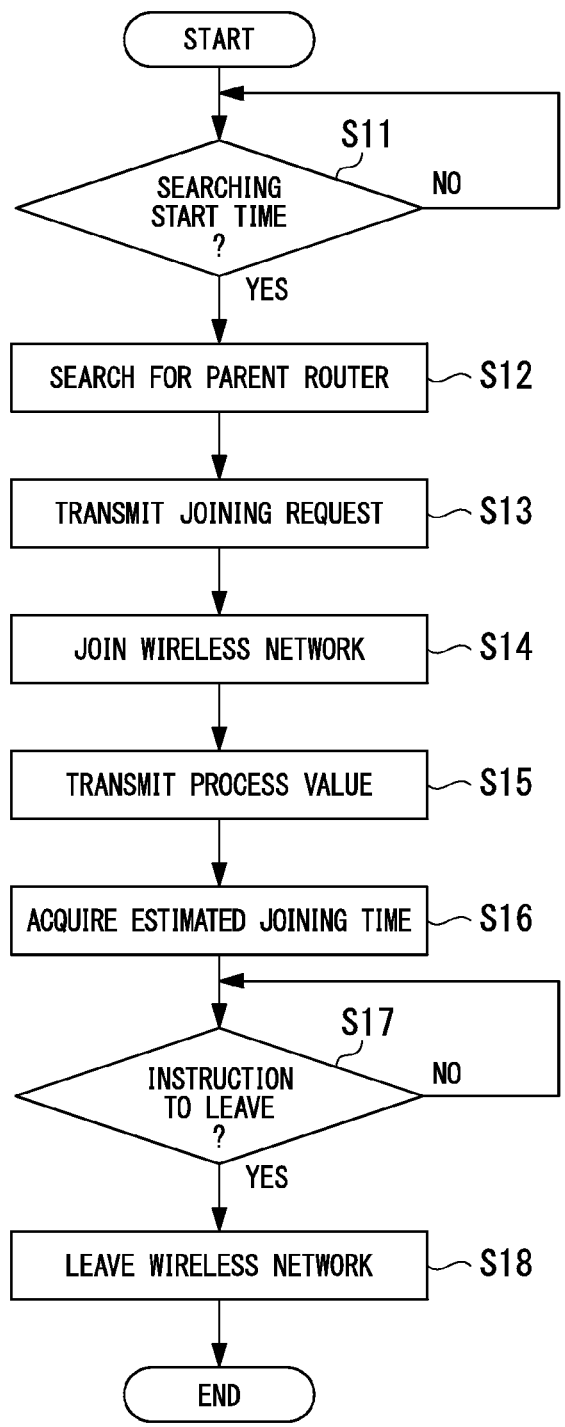
FIG. 6 is a flowchart showing the operation of a wireless device according to the first embodiment of the present invention.
Figure 7:
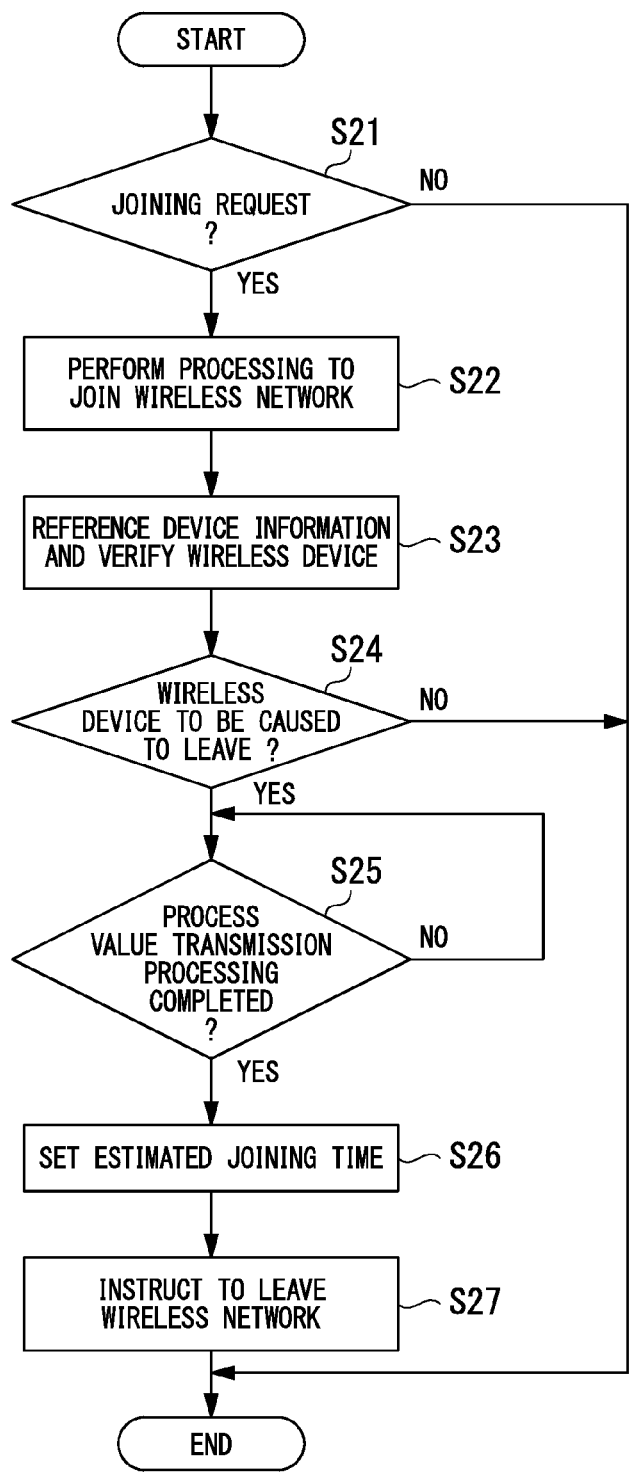
FIG. 7 is a flowchart for describing the operation of a system manager as a management device according to the first embodiment of the present invention.
Figure 8:
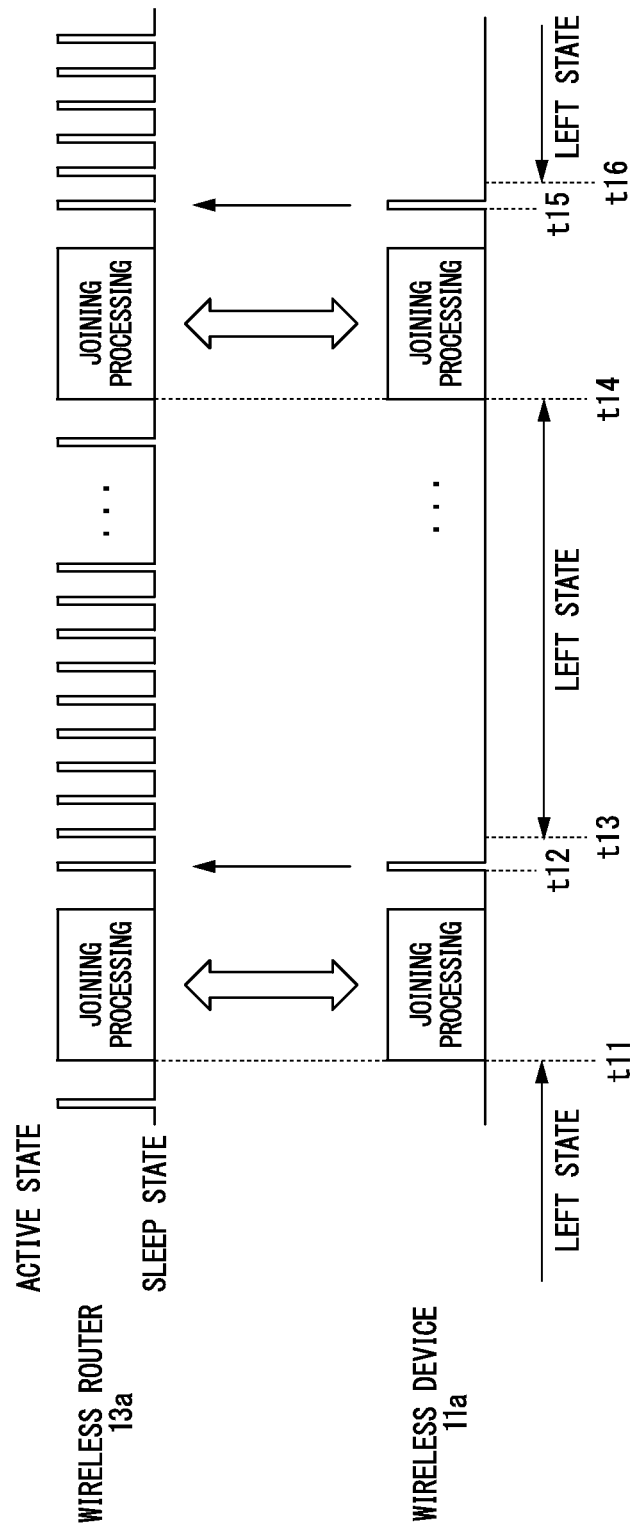
FIG. 8 is a timing diagram for describing the operation of a wireless communication system according to the first embodiment of the present invention.

Next, the operation of the wireless communication system 1 having the above-noted constitution will be described. In the following, the description focuses on the operation of the wireless device 11a joining and leaving the wireless network N1 under the control of the system manager 15. FIG. 6 is a flowchart showing the operation of a wireless device according to the first embodiment of the present invention. FIG. 7 is a flowchart showing the operation of a system manager as a management device according to the first embodiment of the present invention. FIG. 8 is a timing diagram for describing the operation of a wireless communication system according to the first embodiment of the present invention.

The description will be for the case in which the device information Q3 shown in FIG. 4 is stored in the storage unit 33 of the system manager 15. That is, the description will be for the case of the stored device information Q3 having the leave flag values corresponding to the EUI64 allocated to the wireless devices 11a to 11d that are set to 1, and the leave flag value corresponding to the EUI64 allocated to the wireless device 12 that is set to 0. By, for example, an operator in a plant operating the terminal device 18, inputting the device information Q3 shown in FIG. 4 and performing an instruction to download the input device information Q3, the device information Q3 is stored in the storage unit 33 of the system manager 15.

The flowchart of FIG. 6 starts, for example, when wireless device 11a leaves the wireless network N1 and is in the left state. The flowchart of FIG. 7 starts, for example, at a pre-established fixed interval. When the processing of the flowchart shown in FIG. 6 starts, first the processing unit 25c of the control unit 25 of the wireless device 11a judges whether or not the searching start time t1, which is the time for starting the search for the parent router, has been reached (step S11). To simplify this description, the description will be for the case in which, at the last time of the wireless device 11a joining the wireless network N1, the searching start time t1 and searching time period T determined by the above-described Equations (2) and (3) have each been determined by the searching time period calculation unit 25a.

If the processing unit 25c of the control unit 25 of the wireless device 11a judges that the searching start time has not been reached (judgment result of NO), the processing of step S11 is repeated. However, if the processing unit 25c of the control unit 25 of the wireless device 11a judges that the searching start time has been reached (judgment result of YES), the processing unit 25c of the control unit 25 of the wireless device 11a, as shown in FIG. 8, clears the left state and starts joining processing to join the wireless network N1 (time t11 in FIG. 8). When the joining processing starts, the processing unit 25c of the control unit 25 of the wireless device 11a first searches for the parent router, to enable wireless communication with the system manager 15 controlling the wireless network N1 (step S12).

Figure 9:
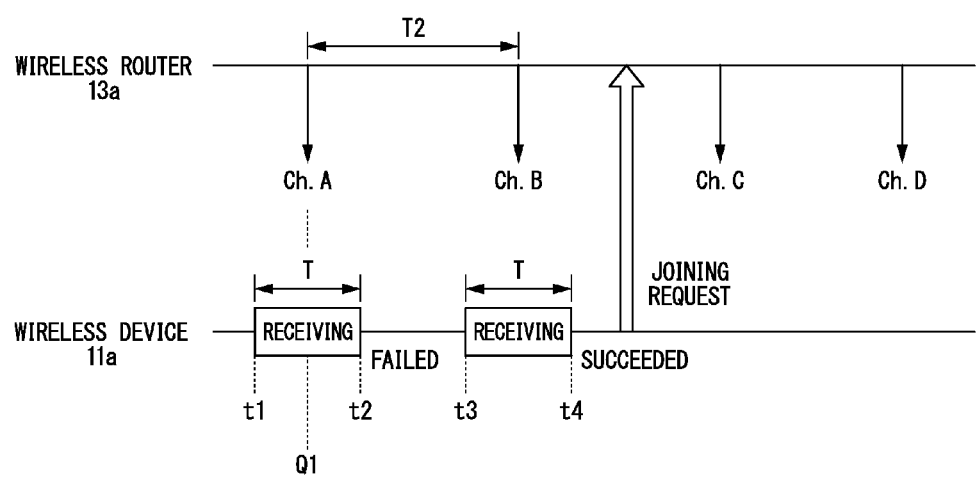
FIG. 9 is a drawing for describing the processing to search for a parent router performed in the first embodiment of the present invention.

FIG. 9 is a drawing for describing the searching processing to search for the parent router performed in the first embodiment of the present invention. When the parent router search processing starts, the processing unit 25c of the control unit 25 of the wireless device 11a reads out the router information Q2 from the non-volatile memory 24 to acquire information indicating the parent router to which the wireless device 11a had been connected before leaving the wireless network N1 (taken to be the wireless router 13a in this case). Then, the advertising packet hopping pattern information, the advertising packet receiving link information, and the time deviation information regarding the wireless router 13a and included in the router information Q2 are used to perform processing to receive advertising packets transmitted from the wireless router 13a.

Specifically, as shown in FIG. 9, until the searching time period T has elapsed from the searching start time t1 (that is, until the searching end time t2, which is t1+T, has been reached), the wireless device 11a performs processing to receive advertising packets transmitted from the wireless router 13a via channel A (Ch. A). In this case, of the plurality of channels A to D (Ch. A to Ch. D) used to transmit advertising packets, the channel that first receives an advertising packet (in the example shown in FIG. 9, channel A (Ch. A)) is determined based on the advertising packet hopping pattern information and the advertising packet receiving link information included in the router information Q2.

In the example shown in FIG. 9, the receiving of an advertising packet transmitted from the wireless router 13a via channel A (Ch. A) has failed. In this manner, if receiving of an advertising packet fails, as shown in FIG. 9, after the advertising packet receiving interval T2 elapses, based on the router information Q2, the wireless device 11a performs processing to receive an advertising packet transmitted from the wireless router 13a via the next channel. That is, until the searching end time t4 (which is t3+T) from the time t3 (the time at which the advertising packet receiving interval T2 has elapsed from the searching start time t1), the wireless device 11a performs processing to receive advertising packets transmitted from the wireless router 13a via channel B (Ch. B). If receiving of advertising packets fails consecutively a pre-established number of times, searching for the parent router is done by a method that is the same as the conventional method.

When an advertising packet is received from the wireless router 13a, the parent router searching processing is ended (the time of "Succeeded" in FIG. 9). When the wireless device 11a receives an advertising packet from the wireless router 13a, the time kept by the clock unit 23 is corrected by the processing unit 25c of the control unit 25 of the wireless device 11a, thereby synchronizing the wireless device 11a with the wireless router 13a. When the parent router searching processing ends, a join request is transmitted to the wireless router 13a from the wireless device 11a, as shown in FIG. 9 (step S13). The join request transmitted from the wireless device 11a is transmitted to the system manager 15, via one of the wireless router 13a and the backbone routers 14a and 14b.

In the system manager 15, the flowchart shown in FIG. 7 is executed with a pre-established fixed interval and the processing unit 34b of the control unit 34 judges whether or not there is a joining request (step S21). If the processing unit 34b of the control unit 34 judges that there is no joining request (judgment result of NO), the processing shown in FIG. 7 ends. However, if a join request is transmitted from the wireless device 11a, the judgment result at step S21 is YES, and the processing unit 34b of the control unit 34 performs processing to join the wireless device 11a making the join request to the wireless network N1 (step S22).

Specifically, the processing unit 34b of the control unit 34 of the system manager 15 judges whether or not the wireless device 11a that made the joining request is permitted to join the wireless network N1. If the wireless device 11a is permitted to join the wireless network N1, the processing unit 34b of the control unit 34 transmits to the wireless device 11a information to the effect that joining the wireless network N1 is permitted (joining permission information). When this joining permission information is transmitted, the wireless device 11a joins the wireless network N1 (step S14). Doing this, the wireless device 11a can use communication resources allocated by the processing unit 34b of the control unit 34 of the system manager 15 to wirelessly communicate via the wireless network N1.

The processing unit 34b of the control unit 34 of the system manager 15 reads out the device information Q3 stored in the storage unit 33 and judges whether or not the wireless device 11a that joined the wireless network N1 is to be removed from the wireless network N1 (step S23). In the device information Q3 shown in FIG. 4, the leave flag value corresponding to the EUI64 allocated to the wireless device 11a (EUI64 having a value with the lower two digits of 01) is set to 1. For this reason, the processing unit 34b of the control unit 34 judges that the wireless device 11a is to be removed from the wireless network N1.

The wireless device 11a that has joined the wireless network N1 transmits a process value measured by the measurement unit 21 to the monitoring control apparatus 17 at the time the wireless router 13a transitions from the sleep state to the active state (time t12 in FIG. 8: step S15), as shown in FIG. 8. The processing unit 34b of the control unit 34 of the system manager 15, based on the results of the judgment at step S23, judges whether or not the wireless device 11a is to be removed (step S24). In this case, because the processing at step S23 judges that the wireless device 11a is to be removed from the wireless network N1, the judgment result is YES. If the judgment result happens to be NO at step S24, the processing shown in FIG. 7 ends.

If the judgment result of step S24 is YES, the processing unit 34b of the control unit 34 judges whether or not the processing by the wireless device 11a to transmit process values to the monitoring control apparatus 17 has been completed (step S25).

If the judgment is that the process value transmission processing has not been completed (judgment result of NO), the processing of step S25 is continued. In contrast, if the judgment is that the process value transmission processing has been completed (judgment result of YES), the estimated joining time setting unit 34a provided in the control unit 34 of the system manager 15 sets the time of the next joining by the wireless device 11a to the wireless network N1 as the estimated joining time Q1 (step S26).

The estimated joining time Q1 set by the estimated joining time setting unit 34a is transmitted to the wireless device 11a via the wireless network N1. The processing unit 25c of the control unit 25 of the wireless device 11a acquires the estimated joining time Q1 that has been transmitted via the wireless network N1 and stores it in the estimated joining time Q1 of the non-volatile memory 24 (step S16). While joined to the wireless network N1, the processing unit 25c of the control unit 25 of the wireless device 11a performs processing to acquire the router information Q2 and store it in the non-volatile memory 24. Each time the router information Q2 is stored in the non-volatile memory 24, the searching time period calculation unit 25a provided in the control unit 25 of the wireless device 11a calculates the searching start time t1 and the searching interval T, using the above-described Equations (2) and (3).

When the estimated joining time Q1 is acquired from the system manager 15, the control unit 25 of the wireless device 11a judges whether or not there is a remove instruction (instruction to remove the wireless device 11a from the wireless network N1) from the system manager 15 (step S17). If the judgment is that there is no remove instruction (judgment result of NO), the processing of step S17 is repeated.

When the setting of the estimated joining time Q1 for the wireless device 11a by the estimated joining time setting unit 34a is completed, the processing unit 34b of the control unit 34 of the system manager 15 gives an instruction to remove the wireless device 11a from the wireless network N1 (step S27). When this instruction is received by the wireless device 11a via the wireless network N1, the judgment result at step S17 becomes YES, and the wireless device 11a leaves the wireless network N1 and goes into the left state (time t13 in FIG. 8: step S18). By the wireless device 11a going into the left state, the communication resources that had been allocated to the wireless device 11a are released.

When the wireless device 11a goes into the left state, the flowchart shown in FIG. 6 starts once again, and the same operation as described above is performed. That is, the judgment of whether or not the next searching start time (time t14 in FIG. 8) has been reached starts (step S11) and, if the judgment is that the time t14 has been reached (judgment result of YES at step S11), a join request is sent and processing is performed to join the wireless network N1 (steps S12 to S14). Then, at time t15 in FIG. 8, processing is performed to, for example, transmit process values (steps S15 and S16), and, at time t16 in FIG. 8, if there has been a removal instruction from the system manager 15, removal is done from the wireless network and the wireless device 11a goes into the left state (steps S17 and S18).

As described above, in the first embodiment, when the estimated joining time, which is the time for joining the wireless network N1, is reached, the wireless device 11a makes a request to join the wireless network N1. Then, the system manager 15 has the wireless device 11a that made the joining request to join the wireless network N1 and wirelessly communicate via the wireless network N1. When the wireless communication via the wireless network N1 is completed, the system manager 15 removes the wireless device 11a from the wireless network N1.

In this manner, in the first embodiment, by removing the wireless device 11a from the wireless network N1, the communication resources that had been allocated to the wireless device 11a are released. This enables more wireless devices to join the wireless network N1 than conventionally possible.

Removing the wireless device 11a from the wireless network N1 also eliminates the clock updating that has been conventionally required. For this reason, it is possible to reduce the power consumption of the wireless device, thereby enabling a reduction of the cost of the wireless device, including the battery cost.

Furthermore, the wireless device 11a in the above-described first embodiment goes into the left state after completing transmission of process values to the monitoring control apparatus 17 and maintains the left state until the next searching start time. For this reason, although the monitoring control apparatus 17 can receive process values transmitted from the wireless device 11a before the wireless device 11a goes into the left state, it cannot communicate with the wireless device 11a in real time. However, real-time communication can be implemented by the monitoring control apparatus 17 dynamically changing the leave graph included in the device information Q3 stored in the storage unit 33 of the system manager 15 via the gateway 16.

Second Embodiment

The second embodiment of the present invention will next be described. In the second embodiment, the descriptions of parts that are the same as in the first embodiment will be omitted.

Figure 10:
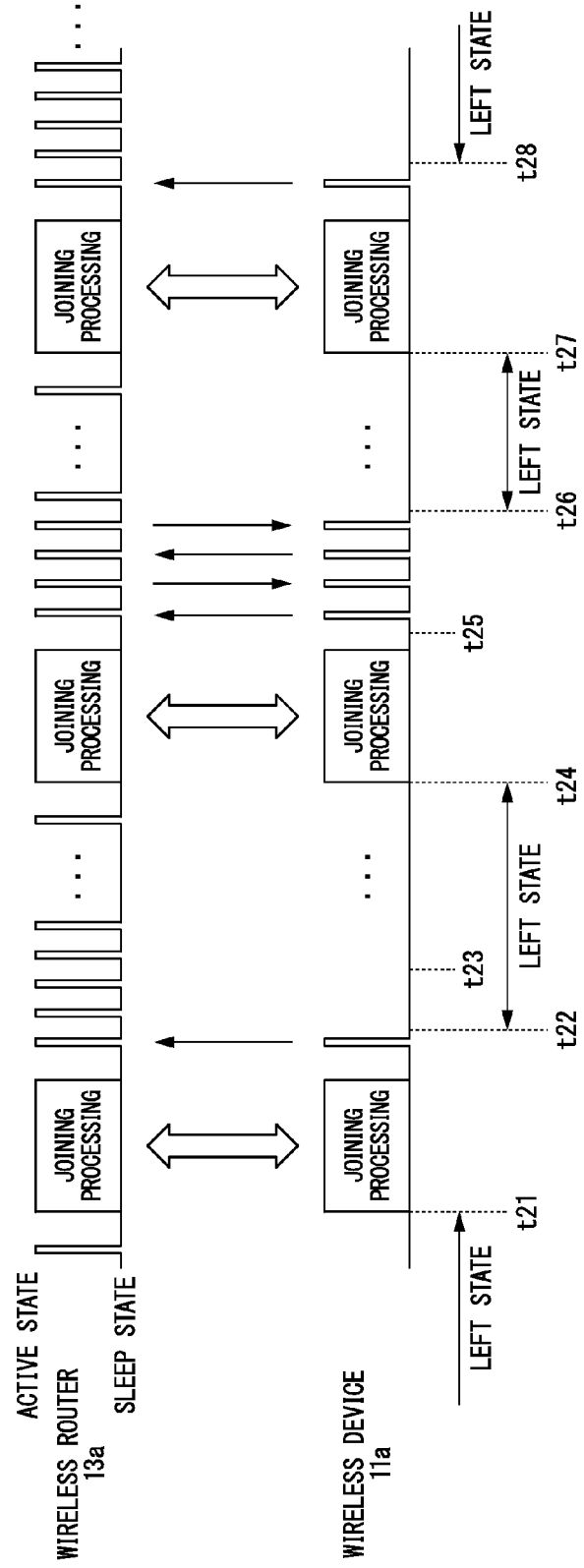
FIG. 10 is a timing diagram for describing the operation of a wireless communication system according to a second embodiment of the present invention.

FIG. 10 is a timing diagram for describing the operation of a wireless communication system according to the second embodiment of the present invention. In this case, the description, similar to the above-described first embodiment, will be as an example of operation in which the wireless device 11a joins and leaves the wireless network N1 under the control of the system manager 15.

First, if the value of the leave flag for the wireless device 11a is set to 1, similar to the above-described first embodiment, the wireless device 11a in the left state is joined to the wireless network N1 when the estimated joining time is reached, and after the process values are transmitted, the wireless device 11a performs operation to go into the left state (time t21 to t22).

At this point, the case will be described, at time t23, at which the wireless device 11a is in the left state, the monitoring control device 17 needs to communicate to the wireless device 11a more times than the communication at time t22 (for example, in addition to process values, communication to change parameters of the wireless device 11a). In this case, the monitoring control apparatus 17 accesses the system manager 15 via the gateway 16, and changes the value of the leave flag for the wireless device 11a included in the device information Q3 stored in the storage unit 33 to 0. The wireless device 11a maintains the left state until reaching the next estimated joining time t24, regardless of whether or not the device information Q3 stored in the storage unit 33 of the system manager 15 has been changed.

When the estimated joining time t24 is reached, the wireless device 11a clears the left state, transmits a request to join the wireless network N1, and joins the wireless network N1. In this case, the value of the leave flag for the wireless device 11a included in the device information Q3 stored in the storage unit 33 of the system manager 15 is changed to 0. For this reason, the wireless device 11a, similar to the wireless device 12, does not leave the wireless network N1 and maintains the joined state. Doing this, the wireless device 11a, as shown in FIG. 10, can communicate with the monitoring control apparatus 17 in real time (time t25 to t26).

In the flowchart shown in FIG. 6, after transmitting process values (step S15) and acquiring the estimated joining time (step S16), the wireless device 11a goes into the state of waiting for a leaving instruction (step S17). However, if it does not leave the wireless network N1 and maintains the joined state, because the wireless device 11a can communicate wirelessly even when waiting for a leaving instruction, it can communicate with the monitoring control apparatus 17 in real time.

At time t26, if communication between the monitoring control apparatus 17 and the wireless device 11a is completed, the monitoring control apparatus 17 accesses the system manager 15 via the gateway 16 and changes the value of the leave flag for the wireless device 11a included in the device information Q3 stored in the storage unit 33 to 1. Then, the processing unit 34b of the control unit 34 of the system manager 15 immediately removes the wireless device 11a from the wireless network N1. Doing this, the wireless device 11a goes into the left state and maintains the left state until the next estimated joining time t27 is reached.

At the next estimated joining time t27, the value of the leave flag for the wireless device 11a included in the device information Q3 stored in the storage unit 33 of the system manager 15 is set to 1. As a result, similar to the above-described first embodiment, the wireless device 11a that is in the left state joins the wireless network N1 and, after transmitting process values, performs operation to go into the left state (time t27 to t28).

In the second embodiment, the description has been for an example in which, when the need arises for the monitoring control apparatus 17 to communicate to the wireless device 11a, the device information Q3 stored in the storage unit 33 of the system manager 15 is changed. However, for example, an operator in a plant may change the device information Q3 stored in the storage unit 33 of the system manager 15 as required, by operating the terminal device 18.

Although a wireless communication system, a management device, a wireless device, and wireless communication method according to the first and second embodiments of the present invention have been described above, the present invention is not limited to the above-described first and second embodiments, and can be freely modified within the scope thereof. For example, although the first and second embodiments have been described for the example of a wireless communication system communicating wirelessly in conformance with ISA100.11a, the present invention can be applied to a wireless communication system communicating wirelessly in conformance with WirelessHART (registered trademark).

In the above-noted first and second embodiments, the example in which the backbone routers 14a and 14b, the system manager 15, and the gateway 16 are each implemented as discrete devices has been described. However, any two or more of these may be implemented as one device. Additionally, although the first and second embodiments have been described for the example in which the wireless devices 11a to 11d and the wireless device 12 are field devices, these are not limited to being field devices.

INDUSTRIAL APPLICABILITY

The present invention can be applied to a wireless communication system, a management device, a wireless device, a wireless communication method, and the like capable of joining more wireless devices to a wireless network N1 than conventionally possible, and further which is required to reduce the power consumption of the wireless devices.

DESCRIPTION OF REFERENCE SYMBOLS

1 Wireless communication system
11a to 15d Wireless device
15 System manager
17 Monitoring control apparatus
18 Terminal device
24 Non-volatile memory
25 Control unit
25a Searching time period calculation unit
25b Event detection unit
25c Processing unit
33 Storage unit
34 Control unit
34a Estimated joining time setting unit
34b Processing unit
N1 Wireless network
Q1 Estimated joining time
Q3 Device information

The invention claimed is:

1. A wireless communication system comprising:
a wireless network;
a plurality of wireless devices in the wireless network, said plurality of devices comprising joined wireless devices currently joined to the network and joining wireless devices currently not joined to the network;
a management device;
a joining wireless device of the plurality of wireless devices being configured to make a request to join the wireless network in a case that a first estimated joining time is reached, the first estimated joining time being a set time for a wireless device that previously left the wireless network to rejoin the wireless network, said time being set by the management device; and
the management device configured to cause the joining wireless device that made a joining request to join the wireless network, and cause a joined wireless device to leave the wireless network, the leave of the joined wireless device being caused in a case that a wireless communication by the joined wireless device via the wireless network is completed,
wherein, before the joined wireless device is caused to leave the wireless network, the management device sets a second estimated joining time, the second estimated joining time being a time to cause a joined wireless device that has left the wireless network to rejoin the wireless network after the first estimated joining time.

2. The wireless communication system according to claim 1, wherein
the management device is configured to transmit, to the joining wireless device, information of the second estimated joining time, and
the joining wireless device is configured to receive the information of the second estimated joining time, and make a request to join the wireless network, the request to join the wireless network being made in a case that the second estimated joining time is reached.

3. The wireless communication system according to claim 1, wherein
the management device is configured to set the second estimated joining time and a third estimated joining time so that there is temporal dispersion between the second estimated joining time and the third estimated joining time, the third estimated joining time being for causing a different wireless device to join the wireless network.

4. The wireless communication system according to claim 1, wherein
the management device comprises a storage that stores a table in which identification information and a flag are associated with each other, the identification information identifying the wireless device, the flag indicating whether or not the wireless device is to be caused to leave the wireless network, and
the management device is configured to control whether or not the wireless device is to be caused to leave the wireless network, the control being performed based on a flag corresponding to identification information obtained from the wireless device.

5. The wireless communication system according to claim 4, wherein
the management device is configured to cause the joined wireless device to leave the wireless network in a case that the flag indicates that the wireless device is to be caused to leave the wireless network, and in a case that the wireless communication is completed, and
the management device is configured not to cause the wireless device to leave the wireless network in a case that the flag indicates that the wireless device is not to be caused to leave the wireless network, and even in a case that the wireless communication is completed.

6. The wireless communication system according to claim 4, further comprising an upstream management device configured to set the contents of the table stored in the storage of the management device.

7. The wireless communication system according to claim 1, wherein the management device is configured to cause the joined wireless device to leave the wireless network by setting the joined wireless device to:
a first state in which time synchronization between the joined wireless device and the wireless communication system is not maintained;
a second state in which security of communication between the joined wireless device and another wireless device is not established; and
a third state in which wireless resources are not allocated to the joined wireless device.

8. The wireless communication system according to claim 1, wherein the wireless device further comprises:
a measurement unit configured to measure a state quantity; and
a communication unit configured to transmit, to the management device, the state quantity measured by the measurement unit, the transmission of the state quantity being performed from the time of joining the wireless network until the time of leaving the wireless network.

9. The wireless communication system according to claim 1, wherein the wireless device comprises a clock configured to keep time, wherein
the clock is configured so as not to perform time synchronization with the wireless communication system while the wireless device has left the wireless network.

10. A management device comprising:
a management communication unit configured to receive, from a joining wireless device, a request to join a wireless network, the request being output from the joining wireless device in a case that a first estimated joining time is reached, the first estimated joining time being a time for a joined wireless device that has left the wireless network to rejoin the wireless network and set by a management device; and
a management controller configured to cause the joining wireless device that made a joining request to the wireless network to join the wireless network, and cause the joined wireless device to leave the wireless network, the leave of the joined wireless device being caused in a case that a wireless communication by the joined wireless device via the wireless network is completed,
wherein, before the joined wireless device is caused to leave the wireless network, the management device sets a second estimated joining time, the second estimated joining time being a time to cause the joined wireless device that has left the wireless network to rejoin the wireless network after the first estimated joining time.

11. The management device according to claim 10, further comprising a setting unit configured to set the next time of joining the wireless network with respect to the joining wireless device, the setting of the next time being performed before a joined wireless device is caused to leave the wireless network.

12. The management device according to claim 10, further comprising a storage that stores a table in which identification information and a flag are associated with each other, the identification information identifying the wireless device, the flag indicating whether or not the wireless device is to be caused to leave the wireless network,
wherein the management controller is configured to control whether or not the joined wireless device is to be caused to leave the wireless network, the control being performed based on a flag corresponding to identification information obtained from the wireless device.

13. A wireless device comprising:
a memory that stores a first estimated joining time, which is a time for a wireless device that had been joined and has left the wireless network to rejoin the wireless network and set by a management device, and a second estimated joining time which is a time to cause a joined wireless device that has left the wireless network to rejoin the wireless network after the first estimated joining time, before the joined wireless device is caused to leave the wireless network, and set by the management device; and
a controller configured to make a request to join the wireless network in a case that the first or second estimated joining time stored in the memory is reached.

14. The wireless device according to claim 13, wherein
the memory stores, in addition to the first and second estimated joining times, a first information and a second information, the first information regarding communication resources that were required the previous time of making a request to join the wireless network, the second information indicating the deviation in time between the time of the wireless network and the time of the wireless device, and
the controller is configured to use the first and second estimated joining times, and the first and second information stored in the memory to perform processing to join the wireless network.

15. The wireless device according to claim 14, wherein
the controller is configured to calculate the searching time period, the calculation of the searching time period being performed by using the first and second estimated joining times, and the first and second information, and
the controller is configured to search for a repeater device that relays a connection of the wireless device to the wireless network, the search being performed during the searching time period.

16. The wireless device according to claim 13, wherein the controller is configured to make a request to join the wireless network in a case that a pre-established event occurs, the request to join the wireless network being performed regardless of the first or second estimated joining time.

17. The wireless device according to claim 16 further comprising a detector configured to detect, as the pre-established event, an abnormality of the wireless device, and wherein
the controller is configured to make a request to join the wireless network in a case that the detector detects the pre-established event.

18. A wireless communication method comprising:
making a request by a joining wireless device to join a wireless network in a case that a first estimated joining time is reached, the first estimated joining time being a time for a joined wireless device that has left the wireless network to rejoin the wireless network;
causing a joining wireless device that made the joining request to join the wireless network and causing wireless communication by the wireless device via the wireless network; and
causing a joined wireless device to leave the wireless network in a case that the wireless communication via the wireless network has been completed; and
before the joined wireless device is caused to leave the wireless network, setting a second estimated joining time, the second estimated joining time being a time to cause the joined wireless device that has left the wireless network to rejoin the wireless network after the first estimated joining time.

\* \* \* \* \*